United States Patent [19]

Probst et al.

[11] Patent Number: 5,439,282
[45] Date of Patent: Aug. 8, 1995

[54] DOOR FOR A SWITCH CABINET, WITH A FRAME TO BE INSTALLED ON THE INNER SIDE

[75] Inventors: Willi Probst, Frankfurt am Main; Richard Blum, Dietzenbach; Hans-Michael Groh, Hainburg; Willi Kuester, Gelnhausen; Klaus-Jürgen Herr, Linsengericht, all of Germany

[73] Assignee: Siemens Aktiengesellschaft, Munich, Germany

[21] Appl. No.: 108,360

[22] Filed: Aug. 18, 1993

[30] Foreign Application Priority Data

Aug. 18, 1992 [DE] Germany .................. 42 27 634.9

[51] Int. Cl.⁶ .......................................... A47B 95/00
[52] U.S. Cl. .................. 312/321.5; 52/483.1; 49/70; 312/293.1
[58] Field of Search .............. 312/321.5, 264, 265, 312/265.5, 265.6, 293.1, 293.2, 223.1; 403/188, 192, 187; 52/813, 456, 455, 483.1, 475.1, DIG. 13, 656.2, 656.7, 782, 784; 49/70

[56] References Cited

U.S. PATENT DOCUMENTS

| 2,000,944 | 5/1935 | Gilbert et al. | 312/321.5 |
| 2,917,355 | 12/1969 | Squire | 312/321.5 |
| 3,725,995 | 4/1973 | Sharp et al. | 52/656.2 |
| 3,863,412 | 2/1975 | Bodycomb et al. | 52/DIG. 13 |
| 3,958,386 | 5/1976 | Pollock | 52/483.1 |
| 4,406,087 | 9/1983 | Asaka et al. | 49/70 |
| 4,430,836 | 2/1984 | McKann | 52/455 |
| 4,462,193 | 7/1989 | Ericson | 52/DIG. 13 |

FOREIGN PATENT DOCUMENTS

| 512218 | 4/1955 | Canada | 312/265.5 |
| 8813904 | 2/1989 | France . | |
| 2145801 | 3/1973 | Germany | 403/187 |
| 2261811 | 1/1993 | United Kingdom | 312/321.5 |

Primary Examiner—Kenneth J. Dorner
Assistant Examiner—Janet M. Wilkens
Attorney, Agent, or Firm—Kenyon & Kenyon

[57] ABSTRACT

A door (4) for a switch cabinet (1) is provided on its inner side (7) with a frame (8) that serves to stiffen the door (4) and secure internal fixtures. The frame (8) is assembled from profiled sections (10) and is fastened to the inner side (7) of the door (4) by means of retainer studs (15) against whose end surfaces dimples (13) of the frame (8) rest. A space (A) is present between the inner side (7) of the door (4) and an adjoining profile part (11) of the profiled sections (10).

16 Claims, 1 Drawing Sheet

DOOR FOR A SWITCH CABINET, WITH A FRAME TO BE INSTALLED ON THE INNER SIDE

BACKGROUND OF THE INVENTION

The present invention relates to a door for a switch cabinet having a frame fastened onto the inner side of the door. In particular, the frame is assembled from profiled sections and is to be attached to the door by means of retainer studs applied onto the inner side of the door and fastening elements interacting therewith, with a stud opening being arranged in a profile part of the frame located closer to the inner side to allow passage of one of the retainer studs, and a fastening opening being arranged in an approximately parallel profile part of the frame, more distant from the inner side, to allow passage of the associated fastening element.

A door of this kind has been disclosed by DE-GM 88 13 904. An additional frame of this type is provided to stiffen the door against undesired deformations, to create the possibility of installing additional devices such as operating elements, measurement instruments, and similar inserts. In the arrangement according to the aforesaid German Utility Model, the retainer studs are designed as threaded bolts onto which special nuts in the form of screws can be threaded. The head of such a nut projects above the surface plane of the profiled section. Furthermore, the profile parts of the profiled sections which face the inner side of the door lie directly against the door.

The known arrangement provides an undesirable stress flow. Specifically, the stress flow when securing the profiled sections runs through the retainer studs, the threaded-on nuts, the profiled sections, and the material of the door between the point at which the retainer stud is fastened to the door and the profiled section contact zone. This can cause the door to deform in the vicinity of the retainer studs when the nuts are tightened.

SUMMARY OF THE INVENTION

The present invention eliminates deformation of the door near the retainer studs, while ensuring the desired stiffening effect of the frame on the door.

The invention achieves this effect by providing a space between the inner side of the door and the profile part located closer to the inner side, and only the profile element of the frame farther away from the inner side of the door is to be clamped with the retainer stud by means of the fastening element.

With this type of fastening, the material of the door surrounding the retainer stud fastening point is free of deforming forces. The only stress is on the fastening point itself, and the stress is smaller, the larger the attachment area of the retainer stud. Although with this arrangement the frame does not lie flat against the inner side of the door, surprisingly good stiffening of the door is nevertheless obtained. The reason for this is that the position of the attachment point causes a certain leverage to take effect for transferring deformation of the door onto the frame.

In this connection it is advisable to select retainer studs which, for fastening to the door, have a shoulder with a diameter greater than that of the shaft.

In an advantageous embodiment of the present invention, each retainer stud has a shaft with an end surface.

Also, the profile part of the profiled sections of the frame that are farther away from the inner side of the door has a dimple that is associated with each retainer stud, and the dimple extends toward the inner side of the door. The dimple comprises the fastening opening, and is designed to brace against the end surface. Furthermore, the shaft of the retainer stud has internal threads to receive the fastening element, which is a screw with external threads.

Not only does this arrangement create the attachment between the retainer stud and the profile part of the frame farther away from the inner side of the door at a certain distance from the inner side of the door, but also the recess created by the dimple can serve to receive a head of the fastening element, thus giving the frame a continuous contact surface for internal fixtures.

Each dimple also can have a cross-sectional shape defined by two arc segments arranged in mirror symmetry and corresponding approximately to a quarter-circle, such that the fastening element that has a flat head to be received by the dimple without projecting above the profile part of the frame. The same dimple shape is also, however, suitable for receiving appropriately dimensioned self-tapping screws for securing internal fixtures or corner pieces which are used to join the profiled sections of the frame.

As already mentioned, the improved effect of the frame is based on the arrangement of the attachment points between the retainer studs and the frame at a certain distance from the inner side of the door. In the context of the present invention, this effect can be even further improved by the fact that at least two retainer studs are provided for each profiled section with each arranged in the region between the center of the respective profiled section and diagonals of the door. This eliminates any fastening of the frame in the vicinity of the diagonals that correspond approximately to the main bending lines of the door.

Although a frame attached to the door in accordance with the present invention considerably increases the door's resistance to undesired deformation, the occurrence of deformations or vibrations cannot be completely ruled out. These phenomena can, however, be reduced by applying one element of a textile adhesion system onto both the inner side of the door and the profile part of the profiled sections of the frame located closer to the inner side, and by having the elements of the adhesion system engage with one another when the frame is in its assembled state.

Textile adhesion systems are known, for example as hook-and-loop strip fasteners, in which a velvet-like tape interacts with a further tape that has cut loops. Two such loop tapes can also be used. In the present connection, these tapes act to prevent any displacement between the door and frame, or to damp such displacement.

BRIEF DESCRIPTION OF THE DRAWINGS

The present invention will be explained in further detail below with reference to the exemplary embodiment depicted in the Figures.

DETAILED DESCRIPTION

Figure 1:
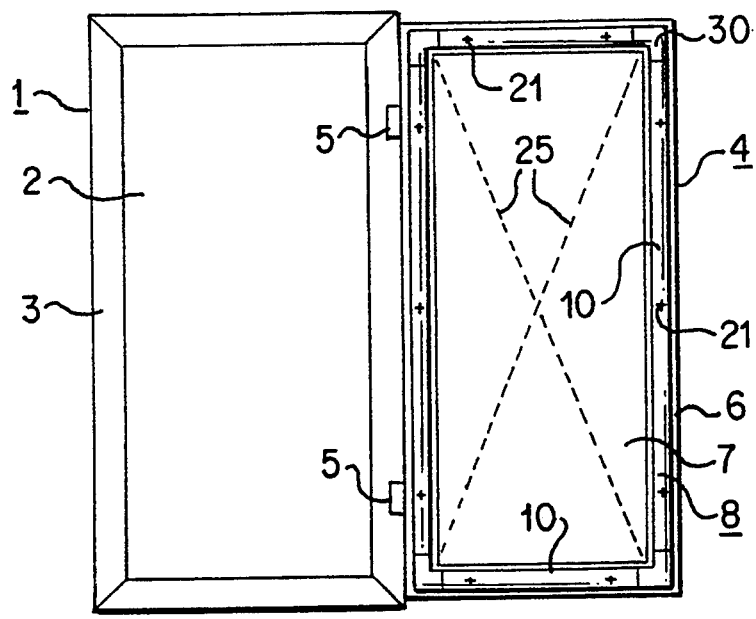
FIG. 1 shows a switch cabinet with an open door, onto the inner side of which a frame is applied.

According to FIG. 1, an embodiment of the present invention shown in switch cabinet 1 has a cabinet body 2 with a frame surface 3 on the front side. Frame surface 3 is provided as the contact surface for a door 4, (shown open in FIG. 1), which is retained on hinges 5. A frame 8 is fastened to the inside 7 of door 4, and is bounded by bent rims 6 along the edge of the door. The frame is fastened by means of fastening means 21 in the form of flat head screws, some of which are indicated in the drawing figure. The frame consists of individual profiled sections 10, which can have a closed hollow profile according to FIG. 2, or some other suitable profile shape.

Figure 2:
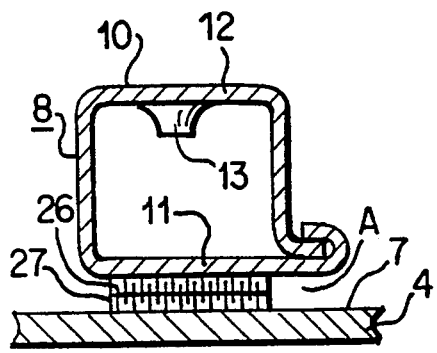
FIG. 2 shows a profiled section in section.

FIG. 2 shows door 4 and a profiled section 1.0 of frame 8, in section. Profiled section 10 has two approximately parallel profile parts 11 and 12, profile part 11 being located closer to inner side 7 of door 4 than profile part 12. Profile part 12 is provided with regularly spaced dimples 13, which are provided both to fasten frame 8 onto door 4 and to fasten internal fixtures or devices onto frame 8. As is evident in greater detail from FIG. 3, dimples 13 each contain a fastening opening 14 for a fastening element 21 that has the configuration of a flat head screw with a flat head 22. Retainer studs 15 are provided as buttresses for dimples 13. The studs have a shaft 16 with an end surface 17 that rests against dimples 13, as well as a shoulder 18 with an enlarged diameter. Shaft 16 contains internal threads 19 for fastening element 21. A stud opening 20 in profile part 11 of profiled section 10 is dimensioned so that shoulder 18 can pass through. It is advantageous to attach retainer studs 16 to door 4 using a suitable welding process.

Flat heads 22 of fastening elements 21 fit into the funnel-shaped openings of dimples 13 without projecting above profile part 12. The selected cross-sectional shape of dimples 13, defined by quarter-circle arcs, is equally suitable for threading in self-tapping screws 23, as shown on the right-hand side of FIG. 3. A support rail 24 can be is secured to the frame in this manner.

Figure 3:
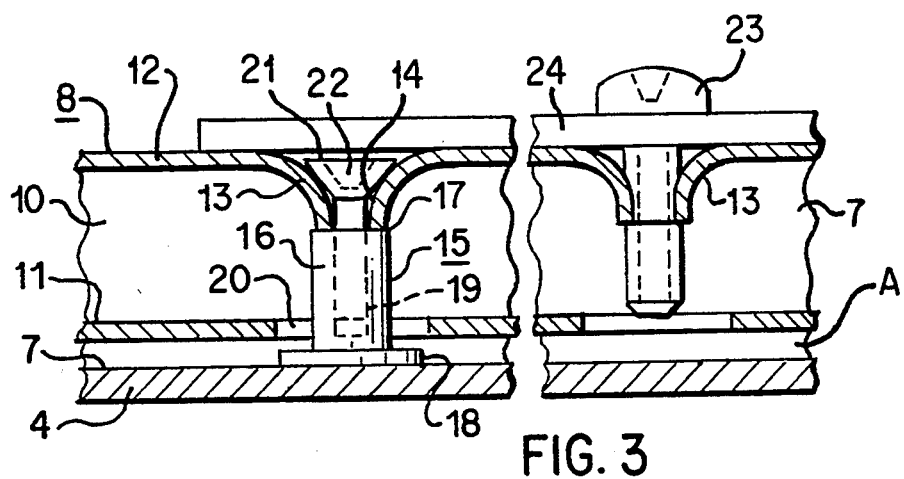
FIG. 3 shows, in section, details of the frame and its attachment.
Figure 4:
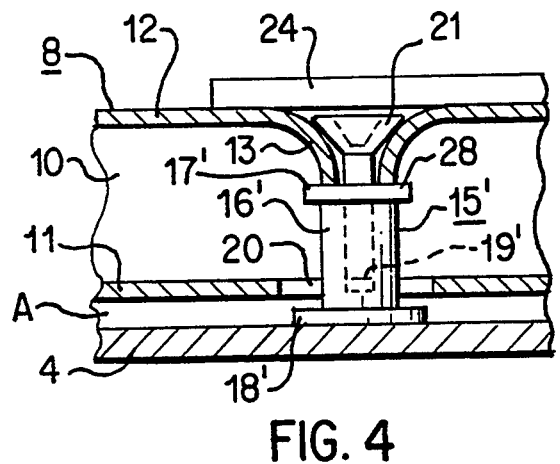
FIG. 4 shows a variant embodiment of the frame attachment.

Moreover, the elements described above are dimensioned so that profile part 11 of frame 8, which faces toward door 4, is located at a certain spacing A away from inner side 7 of door 4. This spacing A is depicted in FIGS. 2, 3, and 4 as a relatively large dimension, solely for illustrative purposes. In fact, all that is necessary, is that the spacing prevent contact during load transfer between frame 8 and door 4 via profile part 11 when the fastening elements are tightened.

The position of the attachments between frame 8 and door 4, i.e. the position of retainer studs 15, is of significance for the desired stiffening effect of frame 8 on door 4. Retainer studs 15 are, as shown with reference to fastening elements 21 marked with crosses, arranged away from diagonals 25 (drawn with dashed lines); three retainer studs 15 are provided for each longer profiled section 10, and two retainer studs for each shorter profiled section 10. Profiled sections 10 can be welded to one another at the corners. In the exemplary embodiment shown, however, corner pieces 30 are attached to profiled sections 10. This facilitates the assembly of frame 8. The attachments between corner pieces 30 and profiled sections 10 can also be designed to be similar to the fastening arrangement of FIG. 3 by which the support rail 4 is attached to the frame 8.

According to FIG. 2, a textile adhesion system can be arranged in gap A. The associated tapelike elements 26 and 27 are advantageously fastened by means of self-adhesive adhesion layers to inner side 7 of door 4 and to profiled parts 11. As a result, elements 26 and 27 engage with one another when frame 8 is installed on door 4, and increase the stiffening and vibration-damping effect of frame 8.

According to FIG. 4, variant retainer studs 15' with a shortened shaft 16' are provided, which have an end surface 17', a collar 18', and internal threads 19'. The shortened shaft 16' creates room for a spacer 28 in the form of a washer to be inserted between end surface 17' and dimple 13. Dimensional tolerances in the assembly of the parts can be compensated for in this manner.

What is claimed is:

1. In a switch cabinet including a door having an inner side and a frame fastened onto the inner side of the door, an improvement comprising:

the frame including a plurality of profile sections, each having a first profile part located close to the inner side of the door and a second profile part, parallel to said first profile part and more remote from the inner side of the door;

wherein each first profile part includes a stud opening to allow passage of a retainer stud and each second profile part includes a fastening opening to allow passage of an associated fastening element to interact with the retainer stud, each profile section including at least one retainer stud disposed in a stud opening and a fastening element to interact with said retainer stud;

wherein a space is provided between the inner side of the door and the entire first profile part and that by means of the fastening element only the second profile part of the frame is directly clamped with the retainer stud.

2. The improvement of claim 1, wherein:

each retainer stud includes a shaft and an end surface;

each second profile part includes a dimple that is associated with each retainer stud and extends toward the inner side of the door and which comprises the fastening opening and is designed to brace against the end surface of the retainer stud; and the shaft of the retainer stud has internal threads to receive the fastening element.

3. The improvement of claim 2, wherein the retainer studs each include a shoulder having a diameter greater than that of the shaft.

4. The improvement of claim 3 wherein each dimple has a cross-sectional shape defined by two arc segments arranged in mirror symmetry and corresponding approximately to a quarter-circle, and that the fastening element has a flat head to be received by the dimple without projecting above said second profile part.

5. The improvement of claim 4 wherein for each profile section there are at least two retainer studs, each of which is arranged in a region between the center of the respective profile section and diagonals of the door.

6. The improvement of claim 4 wherein elements of a textile adhesion system are applied onto both the inner side of the door and the first profile part of the profile sections of the frame, respectively and that said respective elements engage with one another when the frame is in its assembled state.

7. The improvement of claim 3 wherein for each profile section there are at least two retainer studs, each of which is arranged in a region between the center of the respective profile section and diagonals of the door.

8. The improvement of claim 3 wherein elements of a textile adhesion system are applied onto both the inner side of the door and the first profile part of the profile sections of the frame, respectively and that said respective elements engage with one another when the frame is in its assembled state.

9. The improvement of claim 2 wherein each dimple has a cross-sectional shape defined by two arc segments arranged in mirror symmetry and corresponding approximately to a quarter-circle, and that the fastening element has a flat head to be received by the dimple without projecting above said second profile part.

10. The improvement of claim 9 wherein for each profile section there are at least two retainer studs each of which is arranged in a region between the center of the respective profile section and diagonals of the door.

11. The improvement of claim 9 wherein elements of a textile adhesion system are applied onto both the inner side of the door and the first profile part of the profile sections of the frame, respectively and that said respective elements engage with one another when the frame is in its assembled state.

12. The improvement of claim 2 wherein for each profile section there are at least two retainer studs, each of which is arranged in a region between the center of the respective profile section and diagonals of the door.

13. The improvement of claim 2 wherein elements of a textile adhesion system are applied onto both the inner side of the door and the first profile part of the profile sections of the frame, respectively and that said respective elements engage with one another when the frame is in its assembled state.

14. The improvement of claim 1 wherein for each profile section there are at least two retainer studs, each of which is arranged in a region between the center of the respective profile section and diagonals of the door.

15. The improvement of claim 14 wherein elements of a textile adhesion system are applied onto both the inner side of the door and the first profile part of the profile sections of the frame, respectively and that said respective elements engage with one another when the frame is in its assembled state.

16. The improvement of claim 1 wherein elements of a textile adhesion system are applied onto both the inner side of the door and the first profile part of the profile sections of the frame, respectively and that said respective elements engage with one another when the frame is in its assembled state.

* * * * *